United States Patent [19]

Lee

[11] Patent Number: 5,798,006

[45] Date of Patent: Aug. 25, 1998

[54] PRE-MANUFACTURING METHOD OF A CYLINDER HEAD BY MEANS OF JUNCTION OF LOW FUSING POINT Al ALLOYED LAYERS

[75] Inventor: Yong-Song Lee, Seoul, Rep. of Korea

[73] Assignee: Kia Motors Corporation, Seoul, Rep. of Korea

[21] Appl. No.: 697,238

[22] Filed: Aug. 21, 1996

[30] Foreign Application Priority Data

Jul. 26, 1996 [KR] Rep. of Korea ............... 96-30569

[51] Int. Cl.$^6$ ....................................... B23K 20/233
[52] U.S. Cl. ................... 148/512; 148/513; 148/535; 228/248.1
[58] Field of Search .................... 148/512, 513, 148/514, 524, 525, 535; 228/248.1

[56] References Cited

U.S. PATENT DOCUMENTS 5,316,863  5/1994  Johnson et al. ............... 148/513
5,466,277  11/1995  Miura et al. ............... 148/700

FOREIGN PATENT DOCUMENTS 59-110483  6/1984  Japan ............... 228/248.1
971569  11/1982  U.S.S.R. ............... 148/535

Primary Examiner—George Wyszomierski

[57] ABSTRACT

The present invention generally relates to a pre-manufacturing method of a cylinder head by means of junction of low fusing point Al alloyed layers. The pre-manufacturing method of a cylinder head by connecting a plurality of divided members, the method comprises the steps of: coating powders of Cu or Mg on the junction surface of the respective members, forming low fusing point alloyed layers (Al—Cu or Al—Mg) by performing locally the heat treatment on the coated surface, depositing the members on which low fusing point alloyed layers are formed, and connecting the members in a heater.

12 Claims, 1 Drawing Sheet

PRE-MANUFACTURING METHOD OF A CYLINDER HEAD BY MEANS OF JUNCTION OF LOW FUSING POINT Al ALLOYED LAYERS

FIELD OF THE INVENTION

The present invention generally relates to a pre-manufacturing method of a cylinder head by means of junction of low fusing point Al alloyed layers.

PRIOR ART

Generally, an automobile engine includes a piston inserted into a cylinder which is formed in a cylinder block, a cylinder head sealed on an upper portion of the cylinder, and a crank shaft connected to the piston.

The cylinder head is composed of a part of a combustion chamber with the upper surface of the piston, further comprising a valve, a suction and exhaust manifold, and an ignition plug.

As such a cylinder head reaches a high temperature during operation, a good thermal conductivity is required. Furthermore, as it is exposed to a high temperature and combustion pressure, particularly, for a valve seat, the cylinder is required to be wear-resistant and heat resistant. For this reason, Al alloy is mainly used as the material for the cylinder head, and a seat ring of a wear-resistant and heat-resistant material is inserted in a valve seat.

The cylinder head of Al material is manufactured by shaping through a various number of different molds. As a core (or, pattern) for copying a casting mold is manufactured newly every time, there is a disadvantage in that a great deal of manufacturing cost and time are incurred in production.

Accordingly, it is recently suggested that there be a method for developing an apparatus for pre-manufacturing the cylinder head in several separate parts and connecting the separate parts to one another.

FIG. 1 is a exploded perspective view for explaining a pre-manufacturing method of a well known Al cylinder head.

As shown in the drawing, the cylinder head 1 comprises: a first member 2 contacted with the cylinder block; a combustion chamber is formed on the first member; a second member 3a, 3b, 3c connected to an upper layer thereof; a suction and exhaust manifold is formed on the second member; and a third member 4a, 4b equipping a valve having a cam shaft.

As the respective members comprising the cylinder head 1 are connected to each other using a brazing metal, they form a pre-manufactured article of the cylinder head.

In the pre-manufacturing method of the cylinder head as described above, a brazing metal connects the members of the respective parts producing a high cost article, resulting in the increasing of manufacturing cost.

In addition, this is a difficult and complicated process for matching a brazing metal each to each on the junction surface of the respective members. Therefore, there is a shortcoming in that a great deal of pre-manufacturing time is required.

SUMMARY

To solve problems as described above, the present invention is to shorten a junction process and time for connecting a divided cylinder head, and reduce the manufacturing costs.

It is an object of the present invention to provide an aluminum cylinder head manufacturing method by bonding of the low melting Al alloy layers.

BRIEF DESCRIPTION OF THE ATTACHED DRAWINGS

These and other features, aspects and advantages of the present invention will become better understood with regard to the following description, appended claims, and accompanying drawings wherein:

FIG. 1 is an exploded perspective view for explaining a pre-manufacturing method of a conventional Al cylinder head; and FIG. 2 is a perspective view for explaining a pre-manufacturing method of a cylinder head by means of junction of low fusing point Al alloyed layers.

DETAILED DESCRIPTION

Figure 2:
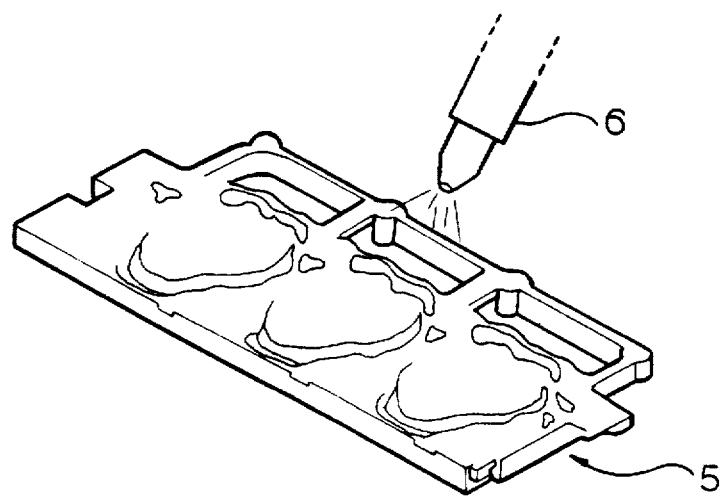

Referring to FIG. 2, according to one embodiment of the present invention, a cylinder head member member 5 comprises a first member contacted with a cylinder block; a combustion chamber formed on the first member; a second member connected to an upper layer thereof; a suction and exhaust manifold formed on the second member; and a third member fixing a valve having a cam shaft. As the respective members are connected to each other, they form of a pre-manufactured article of a cylinder head.

In the present invention, there is a novel method of joining together a first member contacted with a cylinder block; a combustion chamber formed on the first member; a second member connected to an upper layer thereof; a suction and exhaust manifold formed on the second member; and a third member fixing a valve having a cam shaft, each made of Al alloy.

More specifically, the junction method of the present embodiment comprises the steps of mixing 5 μm sized Cu powder on the junction surface of the first member, second member, and third member with an organic solvent, and injecting the mixture through a nozzle 6, to form a coated layer of 0.1–1 mm thickness. In this case, the organic solvent is mainly used as a thinner. After the coated layer is dried completely, low fusing point alloyed layers (Al—Cu alloy) are formed by performing a local heat treatment on the coated layer.

At this time, the heat treatment is performed by a spark heating using a torch, maintaining a high temperature, preferably, more than 550 degrees Celsius without damaging the underlying alloy Al. As there are a plurality of Al—Cu alloyed layers formed, and connected in the heater, the pre-manufactured article of the cylinder head is completed.

At this time, the junction of low fusing point alloyed layers (Al—Cu alloyed layer) is performed at the heater temperature of 550–630 degrees Celsius.

According to another embodiment of the present invention there is provided a method of using Mg powder by means of junction of low fusing point Al alloyed layers.

Figure 1:
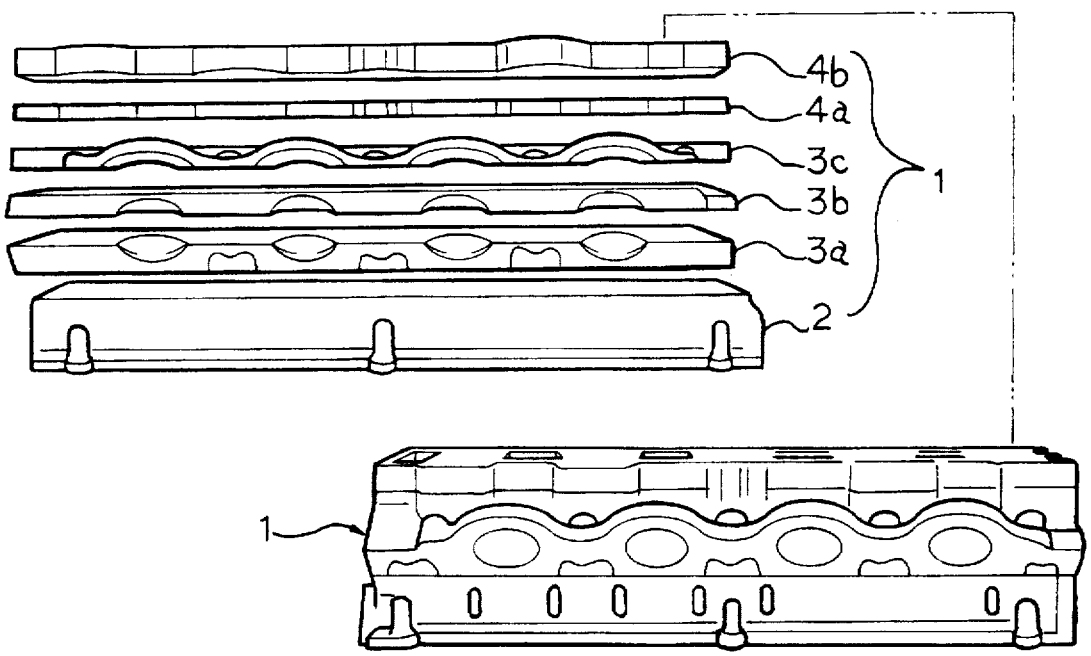

Hereinafter, a method of using Mg powder will be explained with reference to FIG. 1.

More specifically, the junction method of the present embodiment comprises the steps of mixing 5 μm sized Mg powder on the junction surface of the respective first member, second member, and third member with an organic solvent, injecting the mixture through a nozzle 6, to form a coated layer of 0.1–1 mm thickness. After the coated layer is dried completely, low fusing point alloyed layers (Al—Mg alloy) are formed by performing local heat treatment on the coated layer at 440 degrees Celsius using a torch spark. As there are a plurality of Al—Mg alloyed layers, and connected in the heater at 440–630 degrees Celsius, the pre-manufactured article of the cylinder head is formed.

By means of the above-described embodiments a pre-manufacturing method of a cylinder head of the present invention comprises the steps of forming low fusing point alloyed layers on the junction surface of the members composing of a cylinder head, and heating the deposited members. As a result, a pre-manufactured article of an Al cylinder head can be manufactured easily and simply.

It can be known that problems of the prior art can be solved through a pre-manufacturing method of a cylinder head by means of junction of low fusing point Al alloyed layers of the present invention.

Advantageously, there is obtained the effect for shortening the junction process and time of a divided cylinder head through the present invention. In addition, this results in the effect for reducing the manufacturing cost and performing more easier pre-manufacture.

Although the present invention has been described above with reference to the preferred embodiments thereof, those skilled in the art will readily appreciate that various modifications and substitutions can be made thereto without departing from the spirit and scope of the invention as set forth in the appended claims.

What is claimed is:

1. A method of pre-manufacturing a cylinder head, comprising the steps of:

depositing a Cu layer on a plurality of members formed of aluminum alloys;

stacking the plurality of members orderly against each other; and connecting the plurality of members by heating the Cu layer and the members to form an Al—Cu layer between the plurality of members;

wherein the plurality of members comprise a first member contacted with a cylinder block, a second member having a suction and exhaust member formed thereon, and a third member fixing a valve having a cam shaft.

2. The method of claim 1, wherein said Cu is less than 5 μm powder.

3. The method of claim 1, wherein said method further comprises the steps of mixing said Cu powder with an organic solvent and said depositing step is performed by injecting the resultant mixture through a nozzle.

4. The method of claim 3, wherein the deposited layers have a thickness of 0.1–1 mm.

5. The method of claim 1, wherein said heating step is performed at more than 550 degrees Celsius.

6. The method of claim 1, wherein said heating step is performed at 550–630 degrees Celsius.

7. A method of pre-manufacturing a cylinder head, comprising the steps of:

depositing a Mg layer on a plurality of members formed of aluminum alloys;

stacking the plurality of members orderly against each other; and connecting the plurality of members by heating the Mg layer and the members to form an Al—Mg layer between the plurality of members;

wherein the plurality of members comprise a first member contacted with a cylinder block, a second member having a suction and exhaust member formed thereon, and a third member fixing a valve having a cam shaft.

8. The method of claim 7, wherein said Mg is less than 5 μm powder.

9. The method of claim 7, wherein said method further comprises the steps of mixing said Mg powder with an organic solvent and said depositing step is performed by injecting the resultant mixture through a nozzle.

10. The method of claim 9, wherein the deposited layers have a thickness of 0.1–1 mm.

11. The method of claim 7, wherein said heating step is performed at more than 440 degrees Celsius.

12. The method of claim 7, wherein said heating step is performed at 440–630 degrees Celsius.

* * * * *